(12) United States Patent
Asuka et al.

(10) Patent No.: US 10,464,251 B2
(45) Date of Patent: Nov. 5, 2019

(54) THERMAL MOLDING SHEET AND MOLDED ARTICLE

(71) Applicant: Japan Polypropylene Corporation, Chiyoda-ku (JP)

(72) Inventors: Kazuo Asuka, Mie (JP); Hayato Kitaura, Mie (JP); Morikazu Niibe, Mie (JP); Kuninori Takahashi, Mie (JP)

(73) Assignee: Japan Polypropylene Corporation, Chiyoda-ku (JP)

( * ) Notice: Subject to any disclaimer, the term of this patent is extended or adjusted under 35 U.S.C. 154(b) by 0 days.

(21) Appl. No.: 15/766,671

(22) PCT Filed: Oct. 6, 2016

(86) PCT No.: PCT/JP2016/079753
§ 371 (c)(1),
(2) Date: Apr. 6, 2018

(87) PCT Pub. No.: WO2017/061530
PCT Pub. Date: Apr. 13, 2017

(65) Prior Publication Data
US 2018/0304520 A1 Oct. 25, 2018

(30) Foreign Application Priority Data
Oct. 9, 2015 (JP) .................... 2015-201160

(51) Int. Cl.
| | | |
|---|---|---|
| C08L 23/08 | (2006.01) | |
| B29C 51/02 | (2006.01) | |
| B29C 48/00 | (2019.01) | |
| B29C 48/17 | (2019.01) | |
| B29C 48/21 | (2019.01) | |
| B29C 51/00 | (2006.01) | |
| C08J 5/18 | (2006.01) | |
| C08K 3/34 | (2006.01) | |
| C08K 7/02 | (2006.01) | |
| C08K 7/06 | (2006.01) | |
| C08K 7/14 | (2006.01) | |
| C08L 23/10 | (2006.01) | |
| C08L 23/12 | (2006.01) | |
| B29C 51/10 | (2006.01) | |
| B29K 23/00 | (2006.01) | |

(52) U.S. Cl.
CPC .......... *B29C 51/02* (2013.01); *B29C 48/0011* (2019.02); *B29C 48/0012* (2019.02); *B29C 48/0017* (2019.02); *B29C 48/17* (2019.02); *B29C 48/21* (2019.02); *B29C 51/00* (2013.01); *B29C 51/105* (2013.01); *C08J 5/18* (2013.01); *C08K 3/34* (2013.01); *C08K 7/02* (2013.01); *C08K 7/06* (2013.01); *C08K 7/14* (2013.01); *C08L 23/08* (2013.01); *C08L 23/10* (2013.01); *C08L 23/12* (2013.01); *B29C 2791/006* (2013.01); *B29K 2023/08* (2013.01); *B29K 2023/14* (2013.01)

(58) Field of Classification Search
CPC ..................... B29C 5/00; B29C 48/21; B29C 48/17; B29C 48/0017; B29C 48/0012; B29C 51/105; B29C 51/02; B29C 2791/006; C08K 3/34; C08K 7/02; C08K 7/06; C08K 7/14; C08K 3/00; C08K 5/00; C08L 23/10; C08L 23/12; C08L 23/16; C08J 5/18; B29K 2023/14
See application file for complete search history.

(56) References Cited

U.S. PATENT DOCUMENTS

| | | | |
|---|---|---|---|
| 5,508,318 | A | 4/1996 | Comer |
| 6,350,828 | B1 | 2/2002 | Takaoka et al. |
| 6,372,847 | B1 * | 4/2002 | Wouters ................. C08L 23/10 525/191 |
| 2007/0004861 | A1 * | 1/2007 | Cai et al. ................ C08L 23/16 525/192 |
| 2007/0167575 | A1 | 7/2007 | Weaver et al. |
| 2011/0117358 | A1 * | 5/2011 | Kurita ...................... B32B 5/18 428/319.9 |
| 2014/0308502 | A1 | 10/2014 | Farah et al. |
| 2015/0004394 | A1 | 1/2015 | Hotta et al. |
| 2015/0010747 | A1 | 1/2015 | Hotta et al. |

FOREIGN PATENT DOCUMENTS

| | | |
|---|---|---|
| EP | 0 942 013 A1 | 9/1999 |
| JP | 7-145275 A | 6/1995 |
| JP | 2000-117903 A | 4/2000 |
| JP | 2002-294009 A | 10/2002 |
| JP | 2005-68362 A | 3/2005 |

(Continued)

OTHER PUBLICATIONS

International Search Report dated Jan. 10, 2017 in PCT/JP2016/079753 filed Oct. 6, 2016.

*Primary Examiner* — Nathan M Nutter
(74) *Attorney, Agent, or Firm* — Oblon, McClelland, Maier & Neustadt, L.L.P.

(57) ABSTRACT

The present invention provides a thermal molding sheet having a thickness of 1 mm or more and formed by a polypropylene resin composition comprising: 5 to 97 wt % of a polypropylene resin (A) whose MFR and melt tension satisfy specific conditions and which has a long-chain branch structure; 1 to 93 wt % of a polypropylene resin (B) whose MFR satisfies specific conditions; 1 to 40 wt % of a thermoplastic elastomer (C); and 1 to 40 wt % of a filler (D).

6 Claims, 1 Drawing Sheet

(56) References Cited

FOREIGN PATENT DOCUMENTS

| | | |
|---|---|---|
| JP | 2008-540769 A | 11/2008 |
| JP | 2009-270019 A | 11/2009 |
| JP | 2013-10890 A | 1/2013 |
| JP | 2014-534297 A | 12/2014 |
| WO | WO 99/07752 A1 | 2/1999 |
| WO | WO 2013/125700 A1 | 8/2013 |
| WO | WO 2013/125702 A1 | 8/2013 |

* cited by examiner

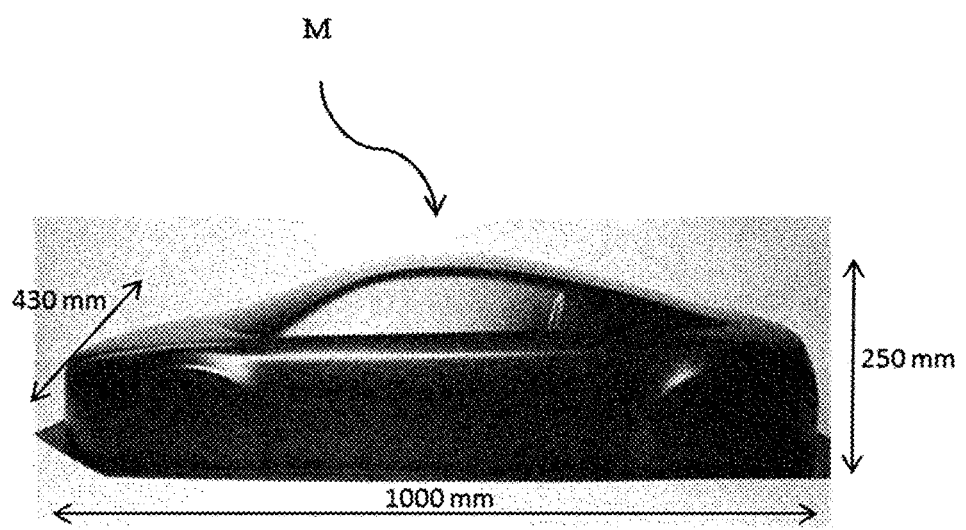

THERMAL MOLDING SHEET AND MOLDED ARTICLE

TECHNICAL FIELD

The present invention relates to a thermal molding sheet and a molded article, particularly to a thermal molding sheet made of a polypropylene resin composition and a molded article.

BACKGROUND ART

A thermal molding sheet can be widely used from small molded products, like packaging containers such as food containers, to large molded products, like structural members such as housing equipment members, by thermal molding such as vacuum molding, pressure molding, vacuum-pressure molding, and double-side vacuum molding. As properties required for the packaging containers, appearance properties such as transparency and gloss, and properties such as heat resistance and oil resistance, for example, when heating and cooking contents in a microwave oven, are required. Further, in recent years, attention to environmental problems has increased, and thus polypropylene-based resin sheets are preferred to amorphous resin sheets such as polystyrene and ABS which are excellent in thermal moldability. In addition, as properties required for the structural members, mechanical properties such as rigidity, strength and heat resistance are required to be excellent, and moldability such as draw down resistance and spreadability are required to be excellent as well.

As a polypropylene-based resin for a sheet used for manufacturing a molded product by a thermal molding method, a propylene homopolymer and a propylene-α-olefin random copolymer are often used from viewpoints of moldability, product rigidity, transparency or the like. However, the above resins are low in melt tension, and not sufficient in draw down resistance when in thermal molding of sheets, so that an improvement is required.

In order to improve the draw down resistance, a resin composition containing a polypropylene resin having a long-chain branch structure has been proposed (see, for example, Patent Document 1). However, with this composition, the draw down resistance may be not sufficient when a thick and large molded product is thermal molded.

Further, since large molded products usually have complicated shapes, sheets are also required to have good spreadability when in thermal molding. Polypropylene-based resins used for conventional thermal molding are not sufficient in spreadability, and even if the polypropylene resins can be shaped into a complicated shape, a molded article is obtained by non-uniform spread, so that the molded article has a large uneven thickness and is prone to buckling and breaking. Therefore, it is difficult to satisfy reliability higher than that required for the structural members. As for such structural members, a thermal-molded article made of ABS or polystyrene, which is an amorphous resin, has been widely used (see, for example, Patent Document 2).

PRIOR ART DOCUMENT

Patent Document

Patent Document 1: Japanese Patent Application Laid-open No. 2002-294009
Patent Document 2: Japanese Patent Application Laid-open No. 2000-117903

SUMMARY OF THE INVENTION

Problems to be Solved by the Invention

However, the amorphous resin used in Patent Document 2 has defects of poor in heat resistance and chemical resistance, and various restrictions in a use environment of structural member products. Further, although balance of physical properties between rigidity and impact resistance of the molded article is regarded as important in order to be suitably used as an industrial member, the polypropylene resin having a high melt tension as shown in Patent Document 1 dose not satisfy impact resistance, particularly at a low temperature.

An object of the present invention is to provide a thermal molding sheet for use in thermal molding such as vacuum molding, pressure molding, vacuum-pressure molding, and double-side vacuum molding, in which sagging of a sheet is small, a molded article having a good shapability to a complicated mold and having a small uneven thickness can be obtained and heat resistance, chemical resistance and balance between rigidity and impact resistance are excellent, even if a large molded article is to be manufactured.

Means for Solving the Problem

A thermal molding sheet of the present invention for achieving the above object is as follows.

(1) A thermal molding sheet having a thickness of 1 mm or more and formed by a polypropylene resin composition, wherein:

the polypropylene resin composition comprises 5 to 97 wt % of a polypropylene resin (A) having a long-chain branch structure, 1 to 93 wt % of a polypropylene resin (B), 1 to 40 wt % of a thermoplastic elastomer (C), and 1 to 40 wt % of a filler (D); and the polypropylene resin (A) has the following properties (A-i) and (A-ii), and the polypropylene resin (B) has the following properties (B-i) and (B-ii), Property (A-i): a melt flow rate (MFR) measured at 230° C. under a load of 2.16 kg is 0.1 to 30 g/10 min Property (A-ii): a melt tension (MT) (unit: g) satisfies $$\log(MT) \geq -0.9 \times \log(MFR) + 0.7, \text{ or}$$

$$\log(MT) \geq 1.15$$

Property (B-i): a melt flow rate (MFR) measured at 230° C. under a load of 2.16 kg is 0.1 to 9.5 g/10 min Property (B-ii): a melt tension (MT) (unit: g) satisfies $$\log(MT) < -0.9 \times \log(MFR) + 0.7, \text{ and}$$

$$\log(MT) < 1.15.$$

(2) The thermal molding sheet according to (1), wherein the polypropylene resin (A) having the long-chain branch structure has the following property (A-iii):

Property (A-iii): an mm fraction of propylene unit triad sequences measured by $^{13}$C-NMR is 95% or more.

(3) The thermal molding sheet according to (1) or (2), wherein the thermoplastic elastomer (C) is an ethylene-α-olefin copolymer.

(4) The thermal molding sheet according to any one of (1) to (3), wherein the filler (D) is at least one selected from talc, glass fibers, carbon fibers and organic fibers.

(5) A thermal-molded article, made of the thermal molding sheet according to any one of (1) to (4).
(6) A method for producing a thermal-molded article, comprising:
vacuum molding, pressure molding, vacuum-pressure molding or double-side vacuum molding the thermal molding sheet according to any one of (1) to (4); and
producing the thermal-molded article.

Effect of the Invention

Since the thermal molding sheet according to the present invention is made of the polypropylene resin composition containing the polypropylene resin (A) having the long-chain branch structure, the heat resistance and the chemical resistance are excellent, the sagging of the sheet is small, and the shapability is excellent. In addition, the obtained thermal-molded article not only has a small uneven thickness which is a basic characteristic required for the thermal molding sheet, but also has an effect of improving the balance between rigidity and impact resistance by combing the thermoplastic elastomer with the filler, since the sheet is excellent in spreadability when in thermal molding, even if the filler is excessively added.

The polypropylene resin (A) having the long-chain branch structure preferably has the property (A-iii): the mm fraction of propylene unit triad sequences measured by $^{13}$C-NMR is 95% or more.

The molded article obtained by thermal molding the thermal molding sheet according to the present invention is excellent in heat resistance and chemical resistance and has small uneven thickness, and is excellent. Further, the balance between rigidity and impact resistance is improved higher than a conventional level.

BRIEF DESCRIPTION OF DRAWINGS

The FIGURE is a schematic diagram showing a shape of a thermal-molded article obtained by large vacuum molding as described in an application example.

DESCRIPTION OF EMBODIMENT

The thermal molding sheet according to the present invention has a thickness of 1 mm or more, and is formed by a polypropylene resin composition. The thermal molding sheet is a raw material for use in thermal molding such as vacuum molding, pressure molding, vacuum-pressure molding, and double-side vacuum molding, and can be used for both large molded products and small molded products. Examples of the large molded products can include an automobile member such as a door trim, an instrument panel and a roof carrier, a building interior panel, a washstand panel, and a large transport tray. Examples of the small molded products can include a food container such as a tray, a dish, and a cup.

The thermal molding sheet may be either a single layer sheet or a multi-layer sheet as long as a layer having a thickness of 1 mm or more formed by the polypropylene resin composition is contained. The single layer sheet is a sheet including only one layer containing a specific polypropylene resin composition. The multi-layer sheet is a sheet in which a layer containing a specific polypropylene resin composition and at least one layer selected from a gas barrier resin layer, an adhesive resin layer, a recycled resin layer, a decorative resin layer or the like are superimposed.

In the thermal molding sheet according to the present invention, a thickness of the layer containing the polypropylene resin composition is 1 mm or more, preferably 1.3 mm or more, more preferably 1.6 mm or more, and still more preferably 1.9 mm or more. In addition, the thermal molding sheet according to the present invention preferably has a thickness of 100 mm or less, more preferably less than 50 mm, and still more preferably less than 10 mm. By making the thickness of the layer containing the polypropylene resin composition be 1 mm or more, the uneven thickness can be reduced.

The thermal molding sheet according to the present invention can be obtained by extruding the polypropylene resin composition into a sheet shape from, for example, a coating solder die through a single-screw extruder or a twin-screw extruder, then pressing the sheet on, for example, a metal roll surface (inside which cooling water and oil are circulated) using an air knife, an air chamber, a hard rubber roll, a steel belt, a metal roll or the like, and cooling and solidifying the pressed sheet. Alternatively, both sides of the thermal molding sheet can be sandwiched by the steel belt and the sheet can be cooled and solidified. Among such cooling methods for a thermal molding sheet, a method using a metal roll and/or a steel belt on both sides of a sheet is most preferable method since a sheet whose sheet surface is less in surface irregularity, that is, a sheet excellent in transparency, can be obtained.

In addition, the thermal molding sheet according to the present invention can be formed as a multi-layer sheet by using an extruder including a plurality of dies, and using a feed block and a multi-manifold.

The polypropylene resin composition constituting the thermal molding sheet according to the present invention comprises 5 to 97 wt % of a polypropylene resin (A) having a long-chain branch structure, 1 to 93 wt % of a polypropylene resin (B), 1 to 40 wt % of a thermoplastic elastomer (C), and 1 to 40 wt % of a filler (D). Hereinafter, the polypropylene resin composition will be described.

Polypropylene Resin (A)

In the present invention, the polypropylene resin (A) has the following properties (A-i) and (A-ii).

Property (A-i): a melt flow rate (MFR) measured at 230° C. under a load of 2.16 kg is 0.1 to 30 g/10 min Property (A-ii): a melt tension (MT) (unit: g) satisfies $$\log(MT) \geq -0.9 \times \log(MFR) + 0.7, \text{ or}$$

$$\log(MT) \geq 1.15$$

In addition, the polypropylene resin (A) preferably has the following property (A-iii).

Property (A-iii): an mm fraction of propylene unit triad sequences measured by $^{13}$C-NMR is 95% or more.

Hereinafter, properties (A-i) to (A-iii) will be described in order.

(A-i): the melt flow rate (MFR) of the polypropylene resin (A) measured at 230° C. under a load of 2.16 kg is 0.1 to 30 g/10 min.

The melt flow rate (MFR) of the polypropylene resin (A) is a value measured at 230° C. under a load of 2.16 kg. The MFR of the polypropylene resin (A) is 0.1 to 30 g/10 min, preferably 0.2 to 20 g/10 min, and more preferably 0.5 to 5 g/10 min. When the MFR is 0.1 g/10 min or more, in extrusion molding a sheet, a load onto an extruder is suppressed and productivity is improved. When the MFR is more than 30 g/10 min, sufficient melt tension cannot be obtained, and the molded article may sag due to its own weight in extrusion molding or thermal molding, which may make molding difficult.

The MFR of the polypropylene resin (A) can be adjusted by controlling a hydrogen concentration or the like during polymerization. In addition, the MFR is a value measured in accordance with JIS K7210.

(A-ii): the melt tension (MT) of the polypropylene resin (A) (unit: g) satisfies $$\log(MT) \geq -0.9 \times \log(MFR) + 0.7, \text{ or}$$

$$\log(MT) \geq 1.15.$$

The melt tension (MT) of the polypropylene resin (A) satisfies $\log(MT) \geq -0.9 \times \log(MFR) + 0.7$ or $\log(MT) \geq 1.15$, and preferably satisfies $\log(MT) \geq -0.9 \times \log(MFR) + 0.9$ or $\log(MT) \geq 1.15$. Still more preferably, $\log(MT) \geq -0.9 \times \log(MFR) + 1.1$ or $\log(MT) \geq 1.15$ is satisfied.

When the melt tension (MT) and the MFR of the polypropylene resin (A) satisfy the above property (A-ii), the draw down resistance is excellent. Although an upper limit of the melt tension (MT) is not limited, $\log(MT) \leq 1.48$ ($MT \leq 30.2$) is preferably, since the spreadability is lowered, the shapability to a mold deteriorates in thermal molding, and molding defects such as split may occur in the molded article in an extreme case, when the upper limit is too large.

As a method for controlling the melt tension (MT) of the polypropylene resin (A), a desired melt tension (MT) can be obtained by adjusting hydrogen of a chain transfer agent to a hydrogen/propylene molar ratio range of $1.0 \times 10^{-6}$ to 0.2 in polymerization, although depending on the type of a catalyst.

In addition, a relationship between the MFR and the melt tension (MT) of the polypropylene resin (A) can be adjusted, for example, according to the type of the catalyst. For example, according to JP-A-2009-275207, a propylene-based polymer, which is obtained by using a catalyst containing two specific transition metal compounds, has a high melt tension and can be used as a polypropylene resin satisfying the relationship between the MFR and the melt tension.

The melt tension (MT) of the polypropylene resin (A) is measured by using a Capillograph (for example, using a Capillograph manufactured by Toyo Seiki Co., Ltd. in examples of the present specification), introducing a resin into a cylinder having a diameter of 9.6 mm and heated to a temperature of 230° C., and extruding the molten resin, at a pushing speed of 20 mm/min, from an orifice having a diameter of 2.0 mm and a length of 40 mm. A value obtained by measuring a tension detected by a pulley when the extruded resin is taken up at a speed of 4.0 m/min is considered as a melt tension (MT).

(A-iii): the mm fraction of the propylene unit triad sequences of the polypropylene resin (A) measured by $^{13}$C-NMR is preferably 95% or more.

The polypropylene resin (A) preferably has a high stereoregularity. Degree of the stereoregularity can be evaluated by the mm fraction of the propylene unit triad sequences measured by $^{13}$C-NMR. The mm fraction of the propylene unit triad sequences of the polypropylene resin (A) obtained by $^{13}$C-NMR is preferably 95% or more, more preferably 96% or more, and still more preferably 97% or more.

The mm fraction is a ratio of propylene unit triad sequences in which methyl branching directions in each of propylene units, among any propylene unit triad sequences including a head-tail bond in a polymer chain, is the same, and an upper limit thereof is 100%. The mm fraction is a value showing that a steric structure of a methyl group in a polypropylene molecular chain is isotactically controlled, and the higher the value is, the more isotactically controlled. When the mm fraction is 95% or more, the draw down resistance in thermal molding is improved.

In addition, a method for measuring the mm fraction of the propylene unit triad sequences of the polypropylene resin (A) measured by $^{13}$C-NMR is as follows.

375 mg of a specimen is completely dissolved in 2.5 ml of deuterated 1,1,2,2-tetrachloroethane in an NMR sample tube (10φ), and then measurement is carried out by a proton complete decoupling method at 125° C. under the following conditions. A central peak among three peaks of the deuterated 1,1,2,2-tetrachloroethane is set to 74.2 ppm as a chemical shift. Chemical shifts of other carbon peaks are based on the above.

Flip angle: 90 degrees
Pulse interval: 10 seconds
Resonance frequency: 100 MHz or more
Integration times: 10,000 or more
Observation area: −20 ppm to 179 ppm
Number of data points: 32,768

The mm fraction is determined by using $^{13}$C-NMR spectra measured under the above conditions. Assignment of spectra is carried out with reference to Macromolecules, (1975) Vol. 8, pp. 687 and Polymer, Vol. 30, pp. 1350 (1989). A more specific method for determining the mm fraction is described in paragraphs [0053] to [0065] of JP-A-2009-275207 in detail, and the method is also used in the present invention.

The polypropylene resin (A) has the long-chain branch structure. As a direct indication that the polypropylene resin (A) has the long-chain branching structure, a branching index g' can be mentioned. The branching index g' is defined as a ratio of an intrinsic viscosity [η] br of a polymer having a long-chain branch structure to an intrinsic viscosity [η] lin of a linear polymer having a same molecular weight as the above polymer, i.e., [η] br/[η] lin. When g'<1, a polymer is said to have a long-chain branch structure.

The definition of the branching index g' is described in, for example, "Developments in Polymer Characterization—4" (J. V. Dawkins ed. Applied Science Publishers, 1983), and is an indication known to those skilled in the art.

A suitable range of the branching index g' can be obtained as a function of an absolute molecular weight Mabs, for example, by using a GPC equipped with a light scattermeter and a viscometer on a detector, as described below.

When the absolute molecular weight Mabs determined by light scattering is 1,000,000, the polypropylene resin (A) preferably has a branching index g' of 0.30 or more and less than 1.00, more preferably 0.55 to 0.98, still more preferably 0.75 to 0.96, and most preferably 0.78 to 0.95.

A method for calculating the branching index g' is as follows.

Alliance GPCV 2000 manufactured by Waters Corporation is used as a GPC device equipped with a differential refractometer (RI) and a viscosity detector (Viscometer). A multi-angle laser light scattering detector (MALLS) DAWN-E of Wyatt Technology Inc. is used as a light scattering detector. The detectors are connected in an order of MALLS, RI and Viscometer. A mobile phase solvent is 1,2,4-trichlorobenzene (added thereto an antioxidant, Irganox 1076 manufactured by BASF Japan Ltd., at a concentration of 0.5 mg/mL).

A flow rate of the mobile phase solvent is 1 mL/min; as for a column, GMHHR-H(S) HT manufactured by Tosoh Corporation is used (2 columns connected). A temperature of the column, a specimen injector and each detector is 140° C.

A concentration of a specimen solution is 1 mg/mL and an injection volume (a volume of a sample loop) is 0.2175 mL. Determination of the absolute molecular weight (Mabs) and a mean square inertia radius (Rg) from MALLS and determination of a limiting viscosity [η] from Viscometer are carried out using data processing software ASTRA (version 4.73.04) attached to MALLS, with reference to the following documents.

REFERENCE DOCUMENTS

1. "Developments in Polymer Characterization—4" (J. V. Dawkins ed. *Applied Science Publishers*, 1983. Chapter 1.)
2. *Polymer*, 45, 6495-6505 (2004)
3. *Macromolecules*, 33, 2424-2436 (2000)
4. *Macromolecules*, 33, 6945-6952 (2000)

The branching index g' is calculated as a ratio of the limiting viscosity ([η] br) obtained by measuring the sample with the above Viscometer to the limiting viscosity ([η] lin) obtained by measuring another linear polymer, i.e., [η] br/[η] lin.

Herein, a commercially available homopolypropylene (Novatec (registered trademark) PP manufactured by Japan Polypropylene Corporation, grade name: FY6) is used as a linear polymer for obtaining the [η] lin. Since it is known that there is a linear relationship between a logarithm of the [η] lin and a logarithm of a molecular weight of a linear polymer, i.e., a Mark-Houwink-Sakurada equation, the value of [η] lin can be numerically obtained by appropriately extrapolating to a low molecular weight side or a high molecular weight side.

The polypropylene resin (A) having the long-chain branch structure can be obtained, for example, by a so-called macromer copolymerization method in which a propylene macromer having a terminal double bond is polymerized from a propylene monomer, and the propylene macromer and the propylene monomer are copolymerized. However, the method for manufacturing the polypropylene resin (A) is not limited to the macromer copolymerization method.

The polypropylene resin (A) may be any one of a propylene homopolymer obtained by homopolymerizing propylene via single-stage polymerization or multi-stage polymerization of two or more stages, a propylene-α-olefin random copolymer obtained by copolymerizing propylene and an α-olefin via single-stage polymerization or multi-stage polymerization of two or more stages, and a propylene-α-olefin block copolymer obtained by polymerization containing a polymerization step of homopolymerizing propylene via single-stage polymerization or multi-stage polymerization of two or more stages to obtain a propylene homopolymer and a copolymerization step of copolymerizing propylene and an α-olefin via single-stage polymerization or multi-stage polymerization of two or more stages to obtain a propylene-α-olefin random copolymer, but is preferably a propylene homopolymer and a propylene-α-olefin random copolymer.

The α-olefin is preferably ethylene or an α-olefin having 4 to 18 carbon atoms. Specifically, examples of the α-olefin include ethylene, 1-butene, 1-pentene, 1-hexene, 1-octene, 1-heptene, 4-methylpentene-1,4-methylhexene-1,4,4-dimethylpentene-1 or the like. In addition, as the α-olefin, one or a combination of two or more of the above may be used.

In the present invention, the polypropylene resin (A) preferably has a molecular weight distribution Mw/Mn, determined from a weight average molecular weight (Mw) and a number average molecular weight (Mn) measured by gel permeation chromatography (GPC), of 3 to 10, more preferably 3.5 to 8, and still more preferably 4.1 to 6. When the Mw/Mn of the polypropylene resin (A) is within the above range, formability is particularly excellent during extrusion molding a sheet.

Further, the polypropylene resin (A) is preferably has a molecular weight distribution Mz/Mn, determined from a Z average molecular weight (Mz) and Mw measured by the gel permeation chromatography (GPC), of 2.5 to 10, more preferably 2.8 to 8, and still more preferably 3 to 6. When the Mz/Mn of the polypropylene resin (A) is within the above range, formability is particularly excellent during extrusion molding a sheet.

In this specification, definitions of Mn, Mw and Mz are based on matters described in "Fundamentals of Polymer Chemistry" (edited by the Society of Polymer Science, Tokyo Kagaku Dojin, 1978), etc. and Mn, Mw and Mz can be calculated from a molecular weight distribution curve by GPC.

In the present invention, a measurement method of GPC is as follows.

Device: GPC manufactured by Waters Corporation (ALC/GPC 150C)
Detector: MIRAN 1A IR detector (measurement wavelength: 3.42 μm) manufactured by FOXBORO Company
Column: AD806M/S (three columns) manufactured by Showa Denko K.K.
Mobile phase solvent: orthodichlorobenzene (ODCB)
Measurement temperature: 140° C.
Flow rate: 1.0 ml/min
Injection amount: 0.2 ml
Preparation of specimen: the specimen is prepared to be a 1 mg/mL solution by using ODCB (containing 0.5 mg/mL of BHT) and dissolving the same at 140° C. for about 1 hour.

Conversion from a retention capacity obtained by GPC measurement into a molecular weight is carried out by using a correction curve (a calibration curve) with a standard polystyrene prepared previously. The following brands manufactured by Tosoh Corporation are used as the standard polystyrene.

F380, F288, F128, F80, F40, F20, F10, F4, F1, A5000, A2500, A1000

A calibration curve is made by injecting 0.2 mL of a solution of ODCB (containing 0.5 mg/mL of BHT) such that each standard polystyrene is 0.5 mg/mL. The calibration curve uses a cubic equation obtained by approximation with a least squares method.

In addition, a viscosity equation, $[\eta]=K\times M^{\alpha}$, used in conversion into the molecular weight uses the following numeric values.

$$PS: K=1.38\times10^{-4}, \alpha=0.7$$

$$PP: K=1.03\times10^{-4}, \alpha=0.78$$

In the present invention, the polypropylene resin (A) having the long-chain branch structure preferably has the following property (A-iv) as an additional feature.

Property (A-iv): a strain hardness (λmax (0.1)) in measurement of an elongational viscosity at a strain rate of 0.1 $s^{-1}$ is 6.0 or more The polypropylene resin (A) having the long-chain branch structure preferably has a strain hardness (λmax (0.1)), in measurement of an elongational viscosity at a strain rate of 0.1 s$^{-1}$, of 6.0 or more, more preferably 0.8 or more.

The strain hardness (λmax (0.1)) is an indication showing a strength in melting. When this value is large, there is an effect for improving the melt tension. As a result, a defective phenomenon of forming an excessive uneven thickness portion in thermal molding can be prevented, even if the molded article has a complex shape. Since improvement of the physical properties of the molded article and thinning (gauge down) of the thickness of the original sheet are achieved, an industrial member including an automobile member can be suitably molded. When the strain hardness of the polypropylene resin (A) having the long-chain branch structure is 6.0 or more, a sufficient effect for suppressing the uneven thickness is found. When the strain hardness is 8.0 or more, an excellent effect for suppressing the uneven thickness is found even in a case where amounts of the filler and the thermoplastic elastomer increase.

A method for calculating the strain hardness λmax (0.1) in measurement of an elongational viscosity at a strain rate of 0.1 s$^{-1}$ is as follows.

The elongational viscosity in a case of a temperature of 180° C. and a strain rate of 0.1 s$^{-1}$ is plotted as a double logarithmic graph with the time t (sec) on a horizontal axis and the elongational viscosity ηE (Pa·s) on a vertical axis. On the double logarithmic graph, a relationship between the time and the viscosity immediately before strain hardening is approximated by a straight line and an approximate straight line is obtained.

Specifically, firstly, an inclination at each time is determined when the elongational viscosity is plotted against the time. In this regard, various average methods are used in consideration that measurement data of the elongational viscosity are discrete. For example, a method in which each of inclinations of adjacent data are obtained and a moving average of several surrounding points is taken, is included.

The elongational viscosity is a monotonically increasing function in a low-strain-amount region, then gradually approaches to a constant value, and coincides with a Trouton viscosity after a sufficient time if there is no strain hardening. However, when there is strain hardening, the elongational viscosity starts to increase with the time, generally from when a strain amount (=strain rate×time) is about 1. That is, the inclination above may tend to decrease with time in the low-strain-amount region, and tend to increase conversely from when the strain amount is about 1, so that there is an inflection point on the curve when the elongational viscosity is plotted against the time. Thus, when the strain amount is in a range of about 0.1 to 2.5, a point where the inclination has a minimum value among the inclinations obtained at each time is determined, a tangent line is drawn at this point and a straight line is extrapolated until the strain amount is 4.0. A maximum value (ηmax) of the elongational viscosity ηE until the strain amount is 4.0 and a time when the maximum value is obtained are determined, and the viscosity on the approximate straight line at that time is ηlin. The ηmax/ηlin is defined as the λmax (0.1).

Polypropylene Resin (B)

In the present invention, the polypropylene resin (B) has the following properties (B-i) and (B-ii).

Property (B-i): a melt flow rate (MFR) measured at 230° C. under a load of 2.16 kg is 0.1 to 9.5 g/10 min Property (B-ii): a melt tension (MT) (unit: g) satisfies $$\log(MT) < -0.9 \times \log(MFR) + 0.7, \text{ and}$$

$$\log(MT) < 1.15.$$

Hereinafter, properties (B-i) to (B-iii) will be described in order.

(B-i): the melt flow rate (MFR) of the polypropylene resin (B) measured at 230° C. under a load of 2.16 kg is 0.1 to 9.5 g/10 min.

The melt flow rate (MFR) (at 230° C. under a load of 2.16 kg) of the polypropylene resin (B) is 0.1 to 9.5 g/10 min, preferably 0.2 to 6.0 g/10 min, more preferably 0.3 to 3.0 g/10 min. When the MFR is 0.1 g/10 min or more, in extrusion molding a sheet, a load onto an extruder is suppressed, and productivity is improved. When the MFR is 9.5 g/10 min or less, it is preferable that the melt tension of a sheet can be maintained high, and the molded article will not sag due to its own weight during extrusion molding or thermal molding.

The MFR of the polypropylene resin (B) can be adjusted by controlling a hydrogen concentration or the like during polymerization. In addition, the MFR is a value measured in accordance with JIS K7210.

(B-ii): the melt tension (MT) of the polypropylene resin (B) (unit: g) satisfies $$\log(MT) < -0.9 \times \log(MFR) + 0.7, \text{ and}$$

$$\log(MT) < 1.15.$$

The melt tension (MT) of the polypropylene resin (B) preferably satisfies $\log(MT) < -0.9 \times \log(MFR) + 0.6$ and $\log(MT) < 1.04$ (MT<11). Still more preferably, $\log(MT) < -0.9 \times \log(MFR) + 0.5$ and $\log(MT) < 0.85$ (MT<7) is preferably satisfied.

When the melt tension (MT) and the MFR of the polypropylene resin (B) satisfy the above property (B-ii), the spreadability is excellent. Although a lower limit of the melt tension is not limited, $\log(MT) > 0.48$ (MT>3) is preferably since the draw down resistance may be lowered and a possible temperature range in thermal molding may be narrowed, when the lower limit is too small.

The polypropylene resin (B) preferably has no long-chain branch structure. The polypropylene resin (B) preferably has a branching index g' of 1. In addition, the branching index g' of the polypropylene resin (B) can be determined in a same manner as the branching index g' of the polypropylene resin (A).

The polypropylene resin (B) may be any one of a propylene homopolymer obtained by homopolymerizing propylene via single-stage polymerization or multi-stage polymerization of two or more stages, a propylene-α-olefin random copolymer obtained by copolymerizing propylene and an α-olefin via single-stage polymerization or multi-stage polymerization of two or more stages, and a propylene-α-olefin block copolymer obtained by polymerization containing a polymerization step of homopolymerizing propylene via single-stage polymerization or multi-stage polymerization of two or more stages to obtain a propylene homopolymer and a copolymerization step of copolymerizing propylene and an α-olefin via single-stage polymerization or multi-stage polymerization of two or more stages to obtain a propylene-α-olefin random copolymer, but is preferably a propylene homopolymer and a propylene-α-olefin random copolymer.

The α-olefin is preferably ethylene or an α-olefin having 4 to 18 carbon atoms. Specifically, examples of the α-olefin include ethylene, 1-butene, 1-pentene, 1-hexene, 1-octene, 1-heptene, 4-methylpentene-1,4-methylhexene-1,4,4-dimethylpentene-1 or the like. In addition, as the α-olefin, one or a combination of two or more of the above may be used.

The polypropylene resin (B) is preferably one that is polymerized by a Ziegler-Natta catalyst. Herein, the Ziegler-Natta catalyst is preferably a catalyst containing solid components essentially containing titanium, magnesium and halogen, organoaluminum, and an electron donor used as required.

In the present invention, the polypropylene resin (B) preferably has a molecular weight distribution Mw/Mn (wherein, Mw is the weight average molecular weight and Mn is the number average molecular weight) measured by gel permeation chromatography (GPC) of 3.5 to 10, more preferably 3.7 to 8, and still more preferably 4 to 6. When the Mw/Mn of the polypropylene resin (B) is within the above range, formability is particularly excellent in extrusion molding a sheet. The molecular weight distribution Mw/Mn of the polypropylene resin (B) can be determined in a same manner as the molecular weight distribution Mw/Mn of the polypropylene resin (A).

In the polypropylene resin composition configuring the thermal molding sheet according to the present invention, when the melt flow rate of the polypropylene resin (A) is MFRa and the melt flow rate of the polypropylene resin (B) is MFRb, a ratio MFRa/MFRb preferably satisfies 30>MFRa/MFRb>1. More preferably, 15>MFRa/MFRb>1.5 is satisfied. A molded article having a smaller uneven thickness can be obtained by making the ratio MFRa/MFRb within the above range. In addition, the MFRa and the MFRb are measured at 230° C. under a load of 2.16 kg as described above.

Thermoplastic Elastomer (C)

The polypropylene resin composition for forming the thermal molding sheet according to the present invention contains has, for example, an impact property thereof improved due to containing the thermoplastic elastomer (C). Examples of the thermoplastic elastomer (C) can include an olefin elastomer, a styrene elastomer or the like. From viewpoints of an impact improving effect and a material cost, an olefin elastomer, especially an ethylene-α-olefin copolymer is preferable.

Examples of the ethylene-α-olefin copolymer can include, for example, an ethylene-propylene copolymer elastomer (EPR), an ethylene-butene copolymer elastomer (EBR), an ethylene-hexene copolymer elastomer (EHR), an ethylene-octene copolymer elastomer (EOR) or the like. Among them, the ethylene-propylene copolymer elastomer, the ethylene-butene copolymer elastomer and the ethylene-hexene copolymer elastomer are preferable.

Examples of the olefin elastomer other than the ethylene-α-olefin copolymer can include an ethylene-α-olefin-diene terpolymer elastomer such as an ethylene-propylene-ethylidene norbornene copolymer, an ethylene-propylene-butadiene copolymer and an ethylene-propylene-isoprene copolymer, a hydrogenated polymer based elastomer such as an ethylene-ethylene-butylene-ethylene copolymer elastomer (CEBC), or the like.

Examples of the styrene elastomer can include a styrene-butadiene-styrene triblock copolymer elastomer (SBS), a styrene-isoprene-styrene triblock copolymer elastomer (SIS), a styrene-ethylene-butylene copolymer elastomer (SEB), a styrene-ethylene-propylene copolymer elastomer (SEP), a styrene-ethylene-butylene-styrene copolymer elastomer (SEBS), a styrene-ethylene-butylene-ethylene copolymer elastomer (SEBC), a hydrogenated styrene-butadiene elastomer (HSBR), a styrene-ethylene-propylene-styrene copolymer elastomer (SEPS), a styrene-ethylene-ethylene-propylene-styrene copolymer elastomer (SEEPS), a styrene-butadiene-butylene-styrene copolymer elastomer (SBBS), a partially hydrogenated styrene-isoprene-styrene copolymer elastomer, a partially hydrogenated styrene-isoprene-butadiene-styrene copolymer elastomer, or the like.

The thermoplastic elastomer (C) preferably has a melt flow rate (MFR; at 190° C. under a load of 2.16 kg) of 0.01 to 10 g/10 min, more preferably 0.1 to 3 g/10 min. When the MFR of the thermoplastic elastomer (C) is 0.1 g/10 min or more, in extrusion molding a sheet, the load onto the extruder is suppressed, and the productivity is improved. When the MFR is 10 g/10 min or less, it is preferable that the melt tension of the sheet can be maintained high, and the molded article will not sag due to its own weight during extrusion molding or thermal molding.

Filler (D)

In the present invention, the polypropylene resin composition has the rigidity thereof improved due to containing the filler (D). The filler (D) may be either an inorganic filler or an organic filler. In addition, a form of the inorganic filler and the organic filler may be any of particulate, plate, rod, whisker, and fibrous.

Examples of the inorganic filler can include oxides such as silica, diatomaceous earth, barium ferrite, beryllium oxide, pumice and pumice balloon, hydroxides such as aluminum hydroxide, magnesium hydroxide and basic magnesium carbonate, carbonates such as calcium carbonate, magnesium carbonate, dolomite and dawsonite, sulfates or sulfites such as calcium sulfate, barium sulfate, ammonium sulfate and calcium sulfite, silicates such as talc, clay, mica, glass fiber, glass balloon, glass beads, calcium silicate, wollastonite, montmorillonite and bentonite, carbons such as carbon black, graphite, carbon fibers and carbon hollow spheres, molybdenum sulfide, boron fibers, zinc borate, barium metaborate, calcium borate, sodium borate, basic magnesium sulfate fibers, potassium titanate fibers, aluminum borate fibers, calcium silicate fibers, calcium carbonate fibers, various metal fibers, or the like.

Examples of the organic filler can include various synthetic fibers such as aromatic polyamide fibers, cellulose fibers, nylon fibers, polyester fibers and polypropylene fibers, thermosetting resin powder, cellophane pieces, shell fibers such as fir shells, wood flour, cotton, jute, paper narrow slips, or the like.

The filler (D) used in the present invention is preferably at least one selected from talc, glass fibers, carbon fibers and organic fibers from the viewpoint of a rigidity improving effect and the material cost.

The filler (D) may be surface-treated with an organic titanate-based coupling agent, an organicsilane coupling agent, a modified polyolefin grafted with an unsaturated carboxylic acid or an anhydride thereof, a fatty acid, a fatty acid metal salt, a fatty acid ester or the like, or may be surface-treated with two or more of the above in combination.

Polypropylene Resin Composition

The polypropylene resin composition configuring the thermal molding sheet according to the present invention comprises 5 to 97 wt % of the polypropylene resin (A), 1 to 93 wt % of the polypropylene resin (B), 1 to 40 wt % of the thermoplastic elastomer (C), and 1 to 40 wt % of the filler (D). Preferably, the composition comprises 10 to 75 wt % of the polypropylene resin (A), 5 to 70 wt % of the polypropylene resin (B), 10 to 40 wt % of the thermoplastic elastomer (C), and 10 to 40 wt % of the filler (D). More preferably, the composition comprises 10 to 60 wt % of the polypropylene resin (A), 10 to 60 wt % of the polypropylene resin (B), 15 to 40 wt % of the thermoplastic elastomer (C), and 15 to 40 wt % of the filler (D). Herein, a total amount of the polypropylene resin (A), the polypropylene resin (B), the thermoplastic elastomer (C), and the filler (D) is 100 wt %. If a ratio of the polypropylene resin (A) to the total amount of the polypropylene resin (A) and the polypropylene resin (B) is 5 wt % or more, it is preferable that the molded article will not sag due to its own weight during extrusion molding or thermal molding.

The content of the thermoplastic elastomer (C) in the polypropylene resin composition is 1 to 40 wt %, preferably 10 to 40 wt %, more preferably 15 to 40 wt %. When the ratio of the thermoplastic elastomer (C) is 1 wt % or more, it is preferable that an effect for improving an impact strength particularly at a low temperature is sufficiently obtained, and a ductile fracture morphology is formed. When the ratio of the thermoplastic elastomer (C) is 40 wt % or less, it is preferable that the rigidity can be ensured.

The content of the filler (D) in the polypropylene resin composition is 1 to 40 wt %, preferably 10 to 40 wt %, more preferably 15 to 40 wt %. When the ratio of the filler (D) is 1 wt % or more, it is preferable that an effect for improving the rigidity is sufficiently obtained. When the ratio of the filler (D) is 40 wt % or less, it is preferable that the specific gravity can be prevented from becoming excessively large. In addition, the extrusion moldability of the sheet can be maintained at a good level. Further, dimensional stability such as warpage and shrinkage after thermal molding can be improved, as a secondary effect, due to containing the filler (D).

In the polypropylene resin composition, the strain hardness ($\lambda$max (0.1)), in measurement of an elongational viscosity at a strain rate of 0.1 s$^{-1}$, is preferably 2.0 or more, more preferably 2.5 or more, and still more preferably 3.0 or more. If the strain hardness of the polypropylene resin composition is 2.0 or more, the excellent effect for suppressing the uneven thickness is found even in a case where the amounts of the filler and the thermoplastic elastomer increases. In order to set the strain hardness of the composition within the above range of values, it is preferable that the polypropylene resin (A) preferably has a strain hardness of 6.0 or more, although depending on the ratio of the polypropylene resin (A), the polypropylene resin (B), the thermoplastic elastomer (C) and the filler (D).

If necessary, for the purpose of further improving the effect of the present invention, imparting other effects or the like within a range not significantly impairing the effects of the present invention, any component can be added to the polypropylene resin composition.

Specifically, examples of the above component can include a colorant such as pigments, a light stabilizer such as hindered amine-based one, an ultraviolet absorber such as benzotriazole-based one, a nucleating agent such as sorbitol-based one, an antioxidant such as a phenol-based or phosphorous one, an antistatic agent such as a nonionic one, a neutralizer such as hydrotalcite, an antibacterial and antifungal agent such as thiazole-based one, a flame retardant such as halogen compounds, a plasticizer, a dispersant such as fatty acid metal salts, a lubricant such as fatty acid amides, a metal deactivator such as nitrogen compounds, a surfactant such as nonionic one, a thermoplastic resin such as polypropylene resins other than the above polypropylene resins (A and B), polyethylene resins, polyamide resins and polyester resins, or the like.

Any two or more of the above components may be used in combination, or any component may be added to the polypropylene resin (A), the polypropylene resin (B) or the like, and two or more of the components can be used in combination in each of the components.

The colorant, for example, an inorganic or organic pigment, is effective for imparting and improving a coloring appearance, a look, a texture, a commodity value, weather resistance, durability or the like of the thermal molding sheet according to the present invention.

Specifically, examples of the inorganic pigment may include carbon black such as furnace carbon and ketjen carbon; titanium oxide; iron oxide (Bengala, etc.); chromic acids (chrome yellow, etc.); molybdic acids; selenide sulfides; ferrocyanides. Examples of the organic pigment may include azo pigments such as slightly soluble azo lakes; soluble azo lakes; insoluble azo chelates; condensable azo chelates; other azo chelates; phthalocyanine pigments such as phthalocyanine blue and phthalocyanine green; threne-based pigments such as anthraquinone, perinone, perylene and thioindigo; dye lakes; quinacridone-based pigments; dioxazine-based pigments; isoindolinone-based pigments, or the like. In order to obtain a metallic tone or pearl tone, aluminum flakes or pearl pigments can be contained. In addition, dyes can also be contained.

The light stabilizer and the ultraviolet absorber, for example, hindered amine compounds, benzotriazole compounds, benzophenone compounds and salicylate compounds, are effective for imparting and improving weather resistance and durability of the thermal molding sheet according to the present invention and for further improving weather discoloration resistance thereof.

Specifically, examples of the hindered amine compounds may include a condensate of dimethyl succinate and 1-(2-hydroxyethyl)-4-hydroxy-2,2,6,6-tetramethylpiperidine, poly[[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino]], tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(1,2,2,6,6-pentamethyl-4-piperidyl) sebacate, bis-2,2,6,6-tetramethyl-4-piperidyl sebacate, or the like. Examples of the benzotriazole compounds may include 2-(2'-hydroxy-3',5'-di-t-butylphenyl)-5-chlorobenzotriazole, 2-(2'-hydroxy-3'-t-butyl-5'-methylphenyl)-5-chlorobenzotriazole, or the like. Examples of the benzophenone compounds may include 2-hydroxy-4-methoxybenzophenone, 2-hydroxy-4-n-octoxybenzophenone, or the like. Examples of the salicylate compounds may include 4-t-butylphenyl salicylate, 2,4-di-t-butylphenyl 3',5'-di-t-butyl-4'-hydroxybenzoate, or the like.

Herein, a method for using the light stabilizer and the ultraviolet absorber in combination is preferable since weather resistance, durability, weather discoloration resistance, or the like are greatly improved.

The antioxidant, for example, a phenol-based antioxidant, a phosphorus antioxidant or a sulfur-based antioxidant, is effective for imparting and improving thermal stability, processing stability, heat-aging resistance or the like of the thermal molding sheet according to the present invention.

The antistatic agent, for example, a nonionic antistatic agent or a cationic antistatic agent, is effective for imparting and improving the antistatic property of the thermal molding sheet according to the present invention.

The amount of any of the above components to be used may preferably be 100 parts by weight or less, with respect to 100 parts by weight of the total amount of the polypropylene resin (A), the polypropylene resin (B), the thermoplastic elastomer (C) and the filler (D).

The polypropylene resin composition can be obtained by mixing the polypropylene resin (A), the polypropylene resin (B), the thermoplastic elastomer (C), the filler (D) and any component added as required through dry blend, a Henschel mixer or the like. Further, the above can be melted and kneaded with a single-screw extruder or a twin-screw extruder.

The thermal molding sheet according to the present invention has a thickness of 1 mm or more, and is formed by the above polypropylene resin composition. The thermal molding sheet can be obtained by extruding the polypropylene resin composition into a sheet through a single-screw extruder or a twin-screw extruder.

The thermal-molded article according to the present invention can be produced by molding the thermal molding sheet through a thermal molding method such as vacuum molding, pressure molding, vacuum-pressure molding, plug-assist vacuum-pressure molding, and double-side vacuum molding. The method for producing a thermal-molded article of the present invention may preferably include steps of vacuum molding, pressure molding, vacuum-pressure molding or double-side vacuum molding a thermal molding sheet and producing the thermal-molded article. Heating methods in such thermal molding may include indirect heating, hot plate heating, heating roll heating, or the like. The thermal-molded article obtained is excellent in heat resistance and chemical resistance, and has small uneven thickness thereof and is excellent. Further, the balance between rigidity and impact resistance is improved higher than a conventional level.

Hereinafter, the present invention will be further described by way of examples, but the scope of the present invention is not limited to these examples.

EXAMPLES

The properties of the polypropylene resin (A), the polypropylene resin (B) and the thermal molding sheet are determined by the following evaluation methods.
1. Evaluation Methods
   (1) Melt Flow Rate (MFR)
   MFRs of the polypropylene resin (A) and the polypropylene resin (B) were measured in accordance with JIS K7210:1999, Method A, Condition M (at 230° C. under a load of 2.16 kg). The unit is g/10 min.
   (2) Melting Point (Tm)
   A melting point (Tm) of the polypropylene resin (A) was measured using DSC 6200 manufactured by Seiko Instruments Inc. 5 mg of a sample piece in a sheet form was packed in an aluminum pan. The temperature was raised from a room temperature to 200° C. at a temperature raising rate of 100° C./min, after being kept for 5 min, decreased to 20° C. at 10° C./min, and then raised to 200° C. at 10° C./min during which a maximum melting peak temperature was determined as the melting point Tm. The unit is ° C.
   (3) Melt Tension MT
   MTs of the polypropylene resin (A) and the polypropylene resin (B) were obtained by measuring the tension using a Capillograph manufactured by Toyo Seiki Co., Ltd. under the following conditions, and the measured tension was taken as the melt tension MT.
   Capillary: diameter 2.0 mm, length 40 mm
   Cylinder diameter: 9.55 mm
   Cylinder extrusion speed: 20 mm/min
   Take-up speed: 4.0 m/min
   Temperature: 230° C.
   When the melt tension MT is extremely high, the resin may break at a take-up speed of 4.0 m/min. In such a case, the take-up speed was lowered by 0.1 m/min, and the melt tension at a maximum speed that is capable of taking-up, was taken as the MT. The unit is gram.
   (4) Molecular Weight Distribution Mw/Mn and Mz/Mw
   The molecular weight distribution was determined by GPC according to the method described above.
   (5) mm Fraction
   The mm fraction of the polypropylene resin (A) was measured by the method described in paragraphs [0053] to [0065] of JP-A-2009-275207 as described above, using GSX-400 and FT-NMR manufactured by Japan Electronics Co., Ltd. The unit is %.
   (6) Strain Hardness (($\lambda$max (0.1)))
   The elongational viscosity was measured under the following conditions.
   Device: ARES manufactured by Rheometorics, Inc
   Tool: Extentional Viscosity Fixture manufactured by TA Instruments
   Measurement temperature: 180° C.
   Strain rate: 0.1/sec
   Preparation of test piece: press-molded to produce a sheet having a size of 18 mm×10 mm and a thickness of 0.7 mm.
   Details of the method for calculating the strain hardness ($\lambda$max (0.1)) are obtained by the method described above, from a relationship between the elongational viscosity measurement time and the elongational viscosity.
   (7) Draw Down Resistance
   A test piece having a size of 300 mm×300 mm was cut out from a polypropylene resin sheet obtained in each of examples and comparative examples, and fixed horizontally to a frame having an inner size of 260 mm×260 mm. A sagging tester, manufactured by Mitsuzu Erie Co., Ltd., was used to guide the test piece to a heating furnace in the tester in which heaters were vertically arranged. The test piece was heated at an ambient temperature of 200° C., and changes over time in vertical displacement of a central part of the sample from start of heating were successively measured with a laser beam.
   Along with heating, the sheet once sags (displaces in a minus direction), and is tensioned back (displace in a plus direction) due to stress relaxation, and then sags again. A position (displacement) of the sheet at the start of heating was set as A (mm), a position (displacement) thereof at a maximum tension return was set as B (mm), and a position (displacement) thereof 10 seconds after the maximum tension return was set as C (mm), and the draw down resistance was evaluated according to the following standards.
   ⊚: B−A≥0 mm and C−B≥−5 mm
   ○: B−A≥−5 mm and C−B≥−10 mm (except a case where B−A≥0 mm and C−B≥−5 mm)
   Δ: B−A≥−5 mm and C−B<−10 mm, or
     B−A<−5 mm and C−B≥−10 mm
   x: B−A<−5 mm and C−B<−10 mm
   Herein, B−A≥−5 mm means that the sheet is tensed and a beautiful appearance can be formed without wrinkles when a container is molded, and C−B≥−5 mm means that a molding time range for obtaining a good molded article is sufficiently wide.
   (8) Spreadability
   A test piece having a size of 200 mm×200 mm was cut out from the polypropylene resin sheet obtained in each of the examples and the comparative examples, and fixed to a circular frame having an inner radius of 80 mm. A sagging tester manufactured by Mitsuzu Erie Co., Ltd., was used to guide the test piece to a heating furnace in the tester in which heaters were vertically arranged. The test piece was heated at an ambient temperature of 200° C., and deep drawing molding of the sheet was carried out by lowering a plug installed in an upper part of the sheet through air cylinder pressure at 0.1 m/sec, two seconds after maximum tension return. As for the obtained cone-shaped molded article having a height of 200 mm, thicknesses of a body at 11 reference points provided at an interval of 25 mm in a height direction of 25 mm to 175 mm were measured with a micrometer, and a minimum measured value was taken as a minimum thickness of the body.

(9) Rigidity: With Respect to the Rigidity, a Flexural Modulus was Evaluated Under the Following Conditions.

Standard No.: Standard JIS K-7171 (ISO 178)

Testing machine: precision universal testing machine Autograph AG-20kNG (Shimadzu Corporation)

Collecting direction of test piece: flow direction (an extrusion molding direction)

Shape of test piece: thickness 4 mm, width 10 mm, length 80 mm

Preparing method for test piece: injection molding

Condition adjustment: leave for 24 hours or more in a thermostatic chamber adjusted to a room temperature of 23° C. and a humidity of 50%

Testing room: a thermostatic chamber adjusted to a room temperature of 23° C. and a humidity of 50%

Number of test piece: 5

Inter-fulcrum distance: 32.0 mm

Testing speed: 1.0 mm/min

(10) Impact Resistance

Evaluation of impact resistance was carried out by performing a high-speed surface impact test (high rate, HRIT (breaking energy)) of the thermal molding sheet under the following conditions. High speed surface impact energy was measured and a fracture morphology was observed. A dart (a flat dart having diameter of 20 mm and a flat striking face), which is a load sensor, was made to collide with test pieces (thermal molding sheets cut into 150 mm×150 mm) placed on a support base (hole diameter: 40 mm) of a Servo pulsar high speed impact tester EHF-2H-20L Model with a thermostat (Shimadzu Corporation) at a speed of 6.3 m/sec, the deformed fracture behavior of the test pieces at impact load were measured, the impact energy absorbed up to a crack initiation point in the obtained impact pattern was calculated and taken as the impact strength of the material. The atmosphere temperature for measurement was −30±0.5° C. Then, the test pieces after the test were visually observed and judged according to the following standards.

◯: Fracture morphology was ductile fracture.

Δ: Ductile fracture morphology, but small pieces are scattered.

x: Fracture morphology was brittle fracture.

Example 1

A mixture, containing 20 wt % of WAYMAX MFX 8 manufactured by Japan Polypropylene Corporation as a polypropylene resin (A) ("A1" in Tables 1 and 3), 40 wt % of Novatech EC 9 manufactured by Japan Polypropylene Corporation as a polypropylene resin (B) ("B1" in Tables 2 and 3), 20 wt % of TAFMER 0550S manufactured by Mitsui Chemicals, Inc. as a thermoplastic elastomer (C) (an ethylene-butene copolymer elastomer, "C1" in Table 3), and 20 wt % of talc as a filler (D) ("Micron White 5000 SMA" (trade name) manufactured by Hayashi Kasei Co., Ltd., "D1" in Table 3), was uniformly stirred and mixed by a ribbon blender to obtain a polypropylene resin composition. In addition, properties of the polypropylene resins A1 and B1 were measured by the above evaluation methods, and the results were shown in Tables 1 and 2.

The polypropylene resin composition was charged into an extruder having a screw diameter of 40 mm, extruded from T type dies at a resin temperature of 230° C., sandwiched between mirror-finished metal cast rolls with a surface temperature of 80° C., and continuously taken up at a rate of 0.5 m/min while being cooled and solidified, so that a polypropylene resin sheet (thermal molding sheet) having a width of 500 mm and a thickness of 2 mm was obtained.

The above evaluations were carried out for this sheet. It was confirmed that this sheet has good draw down resistance and is excellent in spreadability, and a molded article has less uneven thickness, and is excellent in balance between flexural modulus and impact resistance. Composition and evaluation results of the thermal molding sheet were summarized in Table 3.

Example 2

A polypropylene resin sheet was obtained and evaluated in the same manner as in Example 1, except that as a resin used, 20 wt % of a polypropylene resin (A), 30 wt % of a polypropylene resin (B), 20 wt % of a thermoplastic elastomer (C) and 30 wt % of a filler (D) was used. It was confirmed that this sheet has good draw down resistance and is excellent in spreadability, and a molded article has less uneven thickness, and is excellent in balance between flexural modulus and impact resistance. Composition and evaluation results of the thermal molding sheet were summarized in Table 3.

Example 3

A polypropylene resin sheet was obtained and evaluated in the same manner as in Example 1, except that 20 wt % of a polypropylene resin (A), 30 wt % of a polypropylene resin (B), 30 wt % of a thermoplastic elastomer (C) and 20 wt % of a filler (D) were used. It was confirmed that this sheet has good draw down resistance and is excellent in spreadability, and a molded article has less uneven thickness, and is excellent in balance between flexural modulus and impact resistance. Composition and evaluation results of the thermal molding sheet were summarized in Table 3.

Example 4

A polypropylene resin sheet was obtained and evaluated in the same manner as in Example 1, except that 20 wt % of a polypropylene resin (A), 20 wt % of a polypropylene resin (B), 30 wt % of a thermoplastic elastomer (C) and 30 wt % of a filler (D) were used. It was confirmed that this sheet has good draw down resistance and is excellent in spreadability, and a molded article has less uneven thickness, and is excellent in balance between flexural modulus and impact resistance. Composition and evaluation results of the thermal molding sheet were summarized in Table 3.

Example 5

A polypropylene resin sheet was obtained and evaluated in the same manner as in Example 1, except that WAYMAX MFX 6 manufactured by Japan Polypropylene Corporation then was used as a polypropylene resin (A) ("A2" in Tables 1 and 3). In addition, properties of the polypropylene resin A2 were measured by the above evaluation methods, and the results were shown in Table 1. It was confirmed that this sheet has good draw down resistance and is excellent in spreadability, and a molded article has less uneven thickness is excellent in balance between flexural modulus and impact resistance. Composition and evaluation results of the thermal molding sheet were summarized in Table 3.

Example 6

A polypropylene resin sheet was obtained and evaluated in the same manner as in Example 1, except that Daploy WB 140 HMS manufactured by *Borealis* AG was used as a polypropylene resin (A) ("A3" in Tables 1 and 3). In addition, properties of the polypropylene resin A3 were measured by the above evaluation methods, and the results were shown in Table 1. It was confirmed that this sheet has good draw down resistance and is excellent in spreadability, and a molded article has less uneven thickness, and is excellent in balance between flexural modulus and impact resistance. Composition and evaluation results of the thermal molding sheet were summarized in Table 3.

Example 7

A polypropylene resin sheet was obtained and evaluated in the same manner as in Example 1, except that EA 9 manufactured by Japan Polypropylene Corporation was used as a polypropylene resin (B) ("B2" in Tables 2 and 3). In addition, properties of the polypropylene resin B2 were measured by the above evaluation methods, and the results were shown in Table 2. It was confirmed that this sheet has good draw down resistance and is excellent in spreadability, and a molded article has less uneven thickness, and is excellent in balance between flexural modulus and impact resistance. Composition and evaluation results of the thermal molding sheet were summarized in Table 3.

Example 8

A polypropylene resin sheet was obtained and evaluated in the same manner as in Example 1, except that 20 wt % of a polypropylene resin (A), 20 wt % of a polypropylene resin (B), 20 wt % of a thermoplastic elastomer (C) and 40 wt % of a filler (D) were used. It was confirmed that this sheet has good draw down resistance and is excellent in spreadability, and a molded article has less uneven thickness, and is excellent in balance between flexural modulus and impact resistance. Composition and evaluation results of the thermal molding sheet were summarized in Table 3.

Example 9

A polypropylene resin sheet was obtained and evaluated in the same manner as in Example 1, except that 20 wt % of a polypropylene resin (A), 40 wt % of a polypropylene resin (B), 10 wt % of a thermoplastic elastomer (C) and 30 wt % of a filler (D) were used. It was confirmed that this sheet has good draw down resistance and is excellent in spreadability, and a molded article has less uneven thickness, and is excellent in balance between flexural modulus and impact resistance. Composition and evaluation results of the thermal molding sheet were summarized in Table 3.

Comparative Examples 1 to 4

A polypropylene resin sheet (thermal molding sheet) was obtained and evaluated in the same manner as in Example 1, except that formulation of the polypropylene resin (A) and the polypropylene resin (B) was changed as shown in Table 3. Composition and evaluation results of the thermal molding sheet were summarized in Table 3.

Comparative Example 5

A polypropylene resin sheet was obtained and evaluated in the same manner as in Example 1, except that FTS 4000 manufactured by Japan Polypropylene Corporation was used as a polypropylene resin (B) ("B3" in Tables 2 and 3) and that formulation was changed as shown in Table 3. In addition, properties of the polypropylene resin B3 were measured by the above evaluation methods, and the results were shown in Table 2.

TABLE 1

| | | Polypropylene resin (A) | | |
|---|---|---|---|---|
| Evaluation item | Unit | A1 | A2 | A3 |
| MFR | g/10 min | 1.0 | 3.3 | 2.5 |
| Melting point | — | 154 | 155 | 157 |
| mm | % | 98.6 | 98.4 | 92.7 |
| Mw/Mn | — | 4.8 | 4.2 | 5.1 |
| Mz/Mn | — | 3.7 | 3.8 | 3.3 |
| MT | g | 22.0 | 14.5 | 18.2 |
| log(MT) | — | 1.26 | 0.34 | 0.74 |
| $-0.9 \times \log(\text{MFR}) + 0.7$ | — | 0.52 | −0.07 | −0.17 |
| Strain hardness ($\lambda$max (0.1)) | — | 12.0 | 11.7 | 27.1 |

TABLE 2

| | | Polypropylene resin (B) | | |
|---|---|---|---|---|
| Evaluation item | Unit | B1 | B2 | B3 |
| MFR | g/10 min | 0.6 | 0.6 | 8.0 |
| Mw/Mn | — | 4.8 | 4.6 | 5.5 |
| MT | g | 4.5 | 4.2 | 0.2 |
| log(MT) | — | 0.65 | 0.62 | −0.70 |
| $-0.9 \times \log(\text{MFR}) + 0.7$ | — | 0.90 | 0.90 | −0.11 |
| Strain hardness ($\lambda$max (0.1)) | — | 1.0 | 1.0 | 3.1 |

TABLE 3

| | | | Examples | | | | | | |
|---|---|---|---|---|---|---|---|---|---|
| | | Unit | 1 | 2 | 3 | 4 | 5 | 6 | 7 |
| Polypropylene resin (A) | A1 | wt % | 20 | 20 | 20 | 20 | | | 20 |
| | A2 | wt % | | | | | 20 | | |
| | A3 | wt % | | | | | | 20 | |
| Polypropylene resin (B) | B1 | wt % | 40 | 30 | 30 | 20 | 40 | 40 | |
| | B2 | wt % | | | | | | | 40 |
| | B3 | wt % | | | | | | | |
| Thermoplastic elastomer (C) | C1 | wt % | 20 | 20 | 30 | 30 | 20 | 20 | 20 |

TABLE 3-continued

|  |  | Unit | | | | | | | |
|---|---|---|---|---|---|---|---|---|---|
| Filler (D) | D1 | wt % | 20 | 30 | 20 | 30 | 20 | 20 | 20 |
| Strain hardness (λmax (0.1)) | | — | 3.2 | 3.2 | 3.2 | 3.2 | 3.0 | 3.8 | 3.2 |
| Sheet thickness | | mm | 2 | 2 | 2 | 2 | 2 | 2 | 2 |
| Draw down resistance | | — | ○ | ○ | ○ | ○ | ○ | ○ | ○ |
| Minimum thickness after deep drawing molding | | mm | 0.5 | 0.5 | 0.5 | 0.5 | 0.4 | 0.5 | 0.4 |
| Flexural modulus | | MPa | 1650 | 1900 | 1450 | 1700 | 1660 | 1650 | 1980 |
| High speed surface impact energy (−30° C.) | | J | 16 | 18 | 21 | 23 | 16 | 16 | 14 |
| | | Fracture morphology | ○ | ○ | ○ | ○ | ○ | ○ | Δ |

|  |  |  | Examples | | Comparative examples | | | | |
|---|---|---|---|---|---|---|---|---|---|
|  |  | Unit | 8 | 9 | 1 | 2 | 3 | 4 | 5 |
| Polypropylene resin (A) | A1 | wt % | 20 | 20 | 20 | | | | |
|  | A2 | wt % | | | | 20 | | | |
|  | A3 | wt % | | | | | 20 | | |
| Polypropylene resin (B) | B1 | wt % | 20 | 40 | 80 | 80 | 80 | 60 | |
|  | B2 | wt % | | | | | | | |
|  | B3 | wt % | | | | | | | 60 |
| Thermoplastic elastomer (C) | C1 | wt % | 20 | 10 | — | — | — | 20 | 20 |
| Filler (D) | D1 | wt % | 40 | 30 | — | — | — | 20 | 20 |
| Strain hardness (λmax (0.1)) | | — | 3.1 | 3.1 | 3.2 | 3.2 | 3.9 | 1.0 | 1.7 |
| Sheet thickness | | mm | 2 | 2 | 2 | 2 | 2 | 2 | 2 |
| Draw down resistance | | — | ○ | ○ | ○ | ○ | ○ | x | x |
| Minimum thickness after deep drawing molding | | mm | 0.4 | 0.4 | 0.4 | 0.5 | 0.4 | 0.1 | 0.1 |
| Flexural modulus | | MPa | 2700 | 2550 | 1300 | 1310 | 1300 | 1550 | 1580 |
| High speed surface impact energy (−30° C.) | | J | 2.4 | 2.7 | 0.2 | 0.2 | 0.2 | 15 | 16 |
| | | Fracture morphology | Δ | Δ | x | x | x | ○ | ○ |

Application Example

Two polypropylene resin sheets, having a width of 1200 mm and a thickness of 3 mm or 5 mm, were obtained by using the polypropylene resin compositions described in Example 1 and Example 9.

Large vacuum molding was carried out for the obtained sheets, using a mold for molding a thermal-molded article M having a shape and approximate dimensions shown in the FIGURE. It was confirmed that the sheets using the polypropylene resin compositions described in Example 1 and Example 9 had good draw down resistance and had a sufficient molding window whichever a thickness of 3 mm or 5 mm was used. In addition, it was confirmed that the thermal-molded article obtained from the above is suitable for large industrial thermal molding applications since the thermal-molded article had little uneven thickness and was excellent in balance between flexural modulus and impact resistance.

Although the present invention has been described in detail and with reference to particular embodiments, it will be apparent to those skilled in the art that various changes and modifications can be made without departing from the spirit and scope of the present invention. This application is based on Japanese Patent Application filed on Oct. 9, 2015 (Japanese Patent Application No. 2015-201160), the content of which is incorporated herein by reference.

DESCRIPTION OF REFERENCE NUMERALS

M Thermal-molded article

The invention claimed is:

1. A thermal molding sheet having a thickness of 1 mm or more and comprising a polypropylene resin composition, wherein:

the polypropylene resin composition comprises 5 to 97 wt % of a polypropylene resin (A) having a long-chain branch structure, 1 to 93 wt % of a polypropylene resin (B), 1 to 40 wt % of a thermoplastic elastomer (C), and 1 to 40 wt % of a filler (D); and the polypropylene resin (A) has the following properties (A-i) and (A-ii), and the polypropylene resin (B) has the following properties (B-i) and (B-ii), Property (A-i): a melt flow rate (MFR) measured at 230° C. under a load of 2.16 kg is 0.1 to 30 g/10 min, Property (A-ii): a melt tension (MT) (unit: g) satisfies $$\log(MT) \geq -0.9 \times \log(MFR) + 0.7, \text{ or}$$

$$\log(MT) \geq 1.15,$$

Property (B-i): a melt flow rate (MFR) measured at 230° C. under a load of 2.16 kg is 0.1 to 9.5 g/10 min, Property (B-ii): a melt tension (MT) (unit: g) satisfies $$\log(MT) < -0.9 \times \log(MFR) + 0.7, \text{ and}$$

$$\log(MT) < 1.15.$$

2. The thermal molding sheet according to claim 1, wherein the polypropylene resin (A) having the long-chain branch structure has the following property (A-iii):

Property (A-iii): an mm fraction of propylene unit triad sequences measured by $^{13}$C-NMR is 95% or more.

3. The thermal molding sheet according to claim 1, wherein the thermoplastic elastomer (C) is an ethylene-α-olefin copolymer.

4. The thermal molding sheet according to claim 1, wherein the filler (D) is at least one selected from the group consisting of talc, glass fibers, carbon fibers and organic fibers.

5. A thermal-molded article, comprising the thermal molding sheet according to claim 1.

6. A method for producing a thermal-molded article, comprising:
- vacuum molding, pressure molding, vacuum-pressure molding or double-side vacuum molding the thermal molding sheet according to claim 1; and
- producing the thermal-molded article.

* * * * *